(12) United States Patent
Berube et al.

(10) Patent No.: US 6,569,801 B2
(45) Date of Patent: May 27, 2003

(54) ADHESIVE MADE FROM CROSS-LINKING LIQUID CATALYST WITH AMINO RESIN

(75) Inventors: Serge Berube, L'Assomption (CA); John Cutt, Pierrefond (CA)

(73) Assignee: Multibond Inc., Dorval (CA)

( * ) Notice: Subject to any disclaimer, the term of this patent is extended or adjusted under 35 U.S.C. 154(b) by 0 days.

(21) Appl. No.: 10/179,188

(22) Filed: Jun. 26, 2002

(65) Prior Publication Data

US 2003/0040429 A1 Feb. 27, 2003

Related U.S. Application Data

(62) Division of application No. 09/709,363, filed on Nov. 13, 2000, now Pat. No. 6,436,865.

(51) Int. Cl.[7] .............................. B01J 3/00; B65C 9/25; C09K 3/00; C08K 5/09; C08L 39/00
(52) U.S. Cl. .................. 502/159; 502/164; 156/324; 156/351.3; 252/182.11; 252/183.11; 524/47; 524/52; 524/535; 524/555; 524/563; 524/13; 524/417; 524/291; 524/320
(58) Field of Search ................ 502/159, 164; 156/324, 351.3; 252/182.11, 183.11; 524/47, 52, 535, 555, 563, 13, 417, 291, 320

(56) References Cited

U.S. PATENT DOCUMENTS

| | | | |
|---|---|---|---|
| 3,301,809 A | 1/1967 | Goldberg et al. | 260/29.6 |
| 3,563,851 A | 2/1971 | Armour et al. | 161/251 |
| 3,714,099 A | 1/1973 | Biale | 260/29.67 TA |
| 3,714,100 A | 1/1973 | Biale et al. | 260/29.6 TA |
| 3,925,289 A | 12/1975 | Sakato et al. | 260/29.6 B |
| 4,098,950 A | 7/1978 | Gallacher | 428/458 |
| 4,161,467 A | 7/1979 | Markessini | 260/29.4 R |
| 4,162,178 A | 7/1979 | Markessini | 156/62.2 |
| 4,189,415 A * | 2/1980 | Eck et al. | 260/29.6 WA |
| 4,196,271 A * | 4/1980 | Yamada et al. | 525/242 |
| 4,332,655 A | 6/1982 | Berejka | 204/159.2 |
| 4,474,915 A | 10/1984 | Grinacoff | 524/111 |
| 4,517,240 A | 5/1985 | Tracton et al. | 428/326 |
| 4,634,727 A | 1/1987 | Kamikaseda et al. | 524/145 |
| 4,689,384 A | 8/1987 | Kondow et al. | 528/15 |
| 4,737,386 A | 4/1988 | Wotier et al. | 427/389.9 |
| 4,745,025 A | 5/1988 | Mao | 428/288 |
| 4,774,283 A | 9/1988 | Goldstein | 524/816 |
| 4,814,226 A | 3/1989 | Goldstein | 428/288 |
| 4,975,320 A | 12/1990 | Goldstein et al. | 428/288 |
| 4,992,509 A | 2/1991 | Harris | 525/59 |
| 5,109,063 A | 4/1992 | Cheng et al. | 524/820 |
| 5,180,772 A | 1/1993 | Mao et al. | 524/816 |
| 5,182,328 A | 1/1993 | Iacoveillo et al. | 524/803 |
| 5,187,019 A | 2/1993 | Calbo et al. | 428/524 |
| 5,258,457 A | 11/1993 | Erickson | 525/92 |
| 5,500,481 A | 3/1996 | St. Clair | 525/92 K |
| 5,559,195 A | 9/1996 | McGee et al. | 525/383 |
| 5,665,816 A | 9/1997 | Gerharz et al. | 524/733 |
| 5,725,630 A | 3/1998 | Roberts et al. | 71/11 |
| 5,747,578 A | 5/1998 | Schmitz et al. | 524/502 |
| 5,916,941 A | 6/1999 | St. Clair | 524/321 |
| 5,932,647 A | 8/1999 | Schilling et al. | 524/503 |

* cited by examiner

Primary Examiner—Mark L. Bell
Assistant Examiner—Patricia L. Hailey
(74) Attorney, Agent, or Firm—Diomck Stratton Clarizio; Dino P. Clarizio

(57) ABSTRACT

The invention provides an adhesive made from a liquid catalyst cross-linked with an amino resin. The liquid catalyst has improved flexibility and adhesive properties, which are imparted on the adhesive. It is comprised of a cross-linkable polyvinyl acetate, an acid, and an ammonium salt.

23 Claims, No Drawings

ADHESIVE MADE FROM CROSS-LINKING LIQUID CATALYST WITH AMINO RESIN

This application is a divisional of application Ser. No. 09/709,363 filed Nov. 13, 2000, now U.S. Pat. No. 6,436,865.

FIELD OF THE INVENTION

This invention relates to the field of adhesives and more particularly to adhesives made by cross-linking liquid catalysts with amino resins.

BACKGROUND OF THE INVENTION

Amino resins are used in the area of wood products including particleboard, hardwood, plywood, decorative laminate, furniture assembly, etc. Amino resins are supplied in liquid form and are combined with a catalyst at the time of use to form an adhesive substance that is applied to the wood product. This adhesive substance provides adhesion between wood surfaces.

The catalysts are either acidic substances or other materials capable of liberating free acid upon addition to the amino resin. The acidic property of the catalyst promotes cross-linking amino resins and accordingly, the cross-linking or setting of the adhesive substance so that the adhesive substance has the necessary high strength, water resistance and cold flow resistance in order to meet its necessary applications. For example, hardwood floors used for flooring in truck trailer, truck bodies and shipping containers are laminated using a catalyst/amino resin with high strength cross-linking. The quality of lamination can then be verified using Fruehauf Engineering Standards, with one of the most important criteria being the wet shear strength.

The amount and type of catalyst used determines whether the adhesive bond can be cured at room temperature or at higher temperatures. Cure time may vary from a few minutes at high temperatures to a few hours at room temperature. In an application where high frequency heating is required, as for example with laminated pieces of wood flooring, it is common to reduce the time required to cure the adhesive substance.

Current catalysts used in combination with amino resins are in powder form.

A major drawback with a powder catalyst is that powders are not easy to manipulate. Mass transfer of powder materials requires special equipment and/or more human manipulations.

Also, powder catalysts pose certain problems in terms of dust formation during transfer, which may cause toxic effects on humans (irritating mucous membranes and upper respiratory tract).

Care must always be taken to mix homogeneously the blend of powder catalyst and liquid amino resin to avoid any lumping of powder, which will cause a burn or an arc if high frequency heating is used.

While the use of a high level of powder catalyst imparts lower setting time, the amount of powder catalyst mixed with the amino resin is limited to about a maximum of 15% by weight. Increasing the amount of powder catalyst above 15% by weight increases the viscosity and reduces the pot life of the mixture, but decreases the adhesivity and strength of the mixture. Moreover, powder catalysts do not contribute any adhesive property to the mixture and a higher concentration of powder catalyst reduces the relative amount of amino resin in the mixture and therefore reduces the adhesive performance of the resulting mixture.

When properly cured, the resulting bond of the amino resin cross-linked with a powder catalyst is hard and brittle and is characterized by a low impact strength and low elongation point prior to breakage.

Accordingly, there remains a need to develop a catalyst that is commercially beneficial for the wood glue industries and which can be easily mixed at a relatively high concentration with a liquid amino resin to provide a resulting adhesive substance with an adequate viscosity, pot life, and setting time. There also remains a need to provide a catalyst that reduces the cycle time of a high frequency heating press, while contributing adhesive properties to the final adhesive substance.

SUMMARY OF THE INVENTION

It is an object of one aspect of the present invention to provide an adhesive with improved properties.

It is a further object of one aspect of the present invention to provide a catalyst with improved cross-linking capabilities and properties that facilitate mixing with an amino resin.

According to one aspect of the present invention, there is provided an adhesive substance made from mixing a liquid catalyst comprising between 52 and 93% of a copolymer, between 3 and 14% of an acid, and, between 4 and 14% of an ammonium salt, with an amino resin.

In a preferred embodiment of the present invention, the liquid catalyst provides adhesive properties to the catalyst/amino resin mixture and it provides excellent bond strength and excellent water resistance to the adhesive substance.

DETAILED DESCRIPTION OF THE PREFERRED EMBODIMENT

The present invention provides an adhesive made by cross-linking a liquid catalyst with an amino resin. The liquid catalyst is a composition comprised of a copolymer, acid, and ammonium salt. In a preferred embodiment, the liquid catalyst has a storage life of a minimum of three months.

In a preferred embodiment of the present invention, the liquid catalyst composition comprises the following components (all percentages are in weight % to a total of 100%):

| Copolymer emulsion > | 52% to 98% |
| --- | --- |
| Acid | 14% to 0.01% |
| ammonium salt | 14% to 2% |
| ionisable salt | 3% to 0% |
| inert filler | 1% to 0% |
| adjusting water | 16% to 0% |

(A) Copolymer:

The copolymer is the primary component of the liquid catalyst. It is preferably present in an amount ranging from about 52 to 98 weight %. Most preferably, it is present in an amount of 70 to 78 weight %.

In a preferred embodiment, the copolymer is comprised of vinyl acetate and a comonomer capable of crosslinking. An example of a suitable comonomer is N-methylolacrylamide, which shows improved crosslinking capabilities with polyvinyl acetate.

The polyvinyl acetate and comonomer form an emulsion that is self-crosslinkable. The emulsion functions as a water resistant adhesive, thereby improving the adhesivity and impact strength of the liquid catalyst over the non-adhesive powder catalysts used in the prior art.

A commercially available source of copolymer is the self cross-linking poly-vinyl acetate dispersion available under the trade-mark P-1036™ from Dural, a division of Multibond Inc. This copolymer is a dispersion in water having a solids content of about 51% (51±1%), a pH of 4.0 to 5.0, a Brookfield viscosity at 25° C. (spindle 5 at 20 rpm) of 8,000 to 12,000 cps, an average particle size of $0.8\mu$, and a minimum film forming temperature of +15.6° C. The copolymer dispersion is non-ionic with a density of 1.07 $g/cm^3$. It has a stabilization system based on polyvinyl alcohol.

N-methylolacrylamide is purchased at a concentration of 48%. The amount of N-methylolacrylamide based on the weight of vinyl acetate may vary from 3 to 10%.

It will be apparent to one skilled in the art that other copolymers may be used within the confines of the invention without deviating from the invention as claimed. For example, a self-crosslinking polyvinyl acrylic or polyacrylic may be used as part of the copolymer dispersion.

(B) Acid:

In a preferred embodiment, the liquid catalyst includes an acid such as citric acid, commercially available under the name citric acid anhydrous. It is present in the liquid catalyst in an amount ranging from 1 to 14 weight %, and preferably in an amount of from 4 to 7 weight % of the liquid catalyst.

The acid is useful in the liquid catalyst because it initiates hardening of the catalyst-amino resin mixture by improving the cross-linking reaction with the amino resin.

A commercially available source of citric acid anhydrous is available from ADM Food Additive Division. It has a solubility in water of 162 g/100 ml at 25° C., with a maximum water content of 0.5%, and a maximum lead content of 0.5 ppm. Another suitable acid is salicylic acid.

(C) Ammonium Salt:

In a preferred embodiment, the liquid catalyst also includes an ammonium salt. The preferred ammonium salts are ammonium salts derived from strong acids, such as, ammonium chloride and ammonium sulfate. The ammonium salt cross-links with the amino resin and improves the overall cross-linking of the liquid catalyst. It is preferably present in an amount ranging from about 2 to 14 weight %, and most preferably from 4 to 7 weight % of the liquid catalyst.

It has been found that an amount of ammonium salt higher than 14% results in loss of stability. It shortens the pot life of the liquid catalyst-amino resin mixture and shortens the storage life of the catalyst.

A commercially available source of the ammonium salt is ammonium chloride sold by Van Waters & Rogers, which has a specific gravity of 1.53 $g/cm^3$, a pH of 5.5 in 1% water and a boiling point of 520° C.

(D) Ionisable Salt:

The liquid catalyst may also contain an ionisable metal salt, such as sodium chloride. An ionisable metal salt is required if the resulting adhesive substance will be cured using high frequency heating. The ionisable metal salt is employed to adjust the electrical conductivity of the adhesive substance when high frequency heating is used to cure the adhesive substance.

The ionisable metal salt may be present in an amount ranging from about 0 to 3%, and preferably from 1.5 to 3 weight % of the liquid catalyst. It has been found that an amount greater than 3% results in burning and arcing when high frequency heating is used.

(E) Inert Filler:

The liquid catalyst may also contain an inert filler such as nut shell flour or fine hardwood flour. The inert filler may be present in an amount ranging from 0 to 1 weight % and preferably from 0.8 to 1 weight % of the liquid catalyst.

The inert filler thickens the resulting adhesive substance and acts like a water retention agent to hold the adhesive substance in place when it is under heat. Water retention is advantageous to the extent that the rapid heating of the resin mix in the glue line when exposed to high frequency heating will thin, increasing its viscosity. The thinning may take place faster than the chemical action of the resin setting. In such cases, the walnut shell flour or the fine hardwood flour acts as a sponge to hold the adhesive substance in place.

(F) Water:

The liquid catalyst may also include water from the aqueous dispersion of the copolymer and additional water to adjust the solid content and viscosity of the mixture. Total water content is preferably in an amount ranging from 0 to 16 weight %, and most preferably from 10.5 to 14 weight % of the liquid catalyst.

(G) Defoamer:

If necessary, the liquid catalyst may also contain defoamer to prevent excessive foaming during mixing of the liquid catalyst with the amino resin. A commercially available source of a suitable defoamer is Napco NDW, sold by Henkel.

(H) Buffer:

If necessary, the liquid catalyst may also contain a buffer such as tricalcium phosphate for adjusting the pH of the liquid catalyst. A commercially available source of a suitable buffer is tricalcium phosphate, sold by Albright & Wilson.

Amino Resin:

The liquid catalyst is crosslinked to an amino resin to form the resulting adhesive substance. An amino resin is a resin made from the condensation of an amine group with a carbonyl compound and an alcohol. The most commonly used amine compounds are urea, melamine, benzoguanamine, glycoluril, cyclic ureas, thioureas, guanidines, urethanes, cyanamides, etc. The most commonly used carbonyl compounds are aldehydes such as formaldehyde. The most commonly used alcohols are methanol, ethanol and butanol.

Typical amino resins that are used for cross-linking the liquid catalyst include urea formaldehyde resins or melamine urea formaldehyde resins.

Commercial resins exist as mixtures of polymers where each polymer is comprised of many monomers. Each monomer is then a dimer or trimer. The liquid catalyst works with the amino resin, independently of the ratio of dimers/trimers.

The amino resins are usually supplied in liquid form having a solid content of 50–65% and a storage life of about 3 months at 20° C.

The Preparation of the Adhesive

In operation, the resulting adhesive substance made from the liquid catalyst of the present invention can be applied with the same conventional equipment as that used with powder catalysts.

The liquid catalyst is pre-mixed to form a uniform composition. The liquid catalyst is then added to an amino resin so that preferably a 20–25% composition of liquid catalyst by weight is present in the mixture.

The combined liquid catalyst and resin are then mixed to create a homogeneous composition. At this stage, the nature of the liquid catalyst is advantageous over powder catalysts used in the prior art in that powder catalysts often form lumps within the adhesive substance which results in arcing when the adhesive application is treated in a high frequency press.

The resulting adhesive substance is then fed into a roller applicator where it is applied to the wood surface. The wood is then transferred to a high frequency press or hot press for drying and curing.

Typically, a high frequency press is used to laminate pieces of wood for an application such as a truck flooring. High frequency heating provides a method for raising the temperature of materials that are normally electrical insulators by placing these materials between metal plates and applying radio frequency voltage. It facilitates coherent electromagnetic radiation of energy. In general, the temperature of the wood in the high frequency press is 165° F. to 210° F.

The use of a high frequency press is expensive. In general, it takes 165 seconds for one cycle of a high frequency press using a powder catalyst-amino resin mixture. With a liquid catalyst present in a 20–25% weight composition, the time required for high frequency pressing is reduced to 120 seconds per cycle, thereby significantly decreasing the cost of curing.

A hot press is used for applications that do not require lamination on the edges of the wood. A hot press is suitable for applications such as face lamination which application may be made to plywood.

The liquid catalyst of the present invention is advantageous in the above processes in that it facilitates mixing with the amino resin. In addition, the use of a liquid catalyst, and in particular the addition of polyvinyl acetate within the catalyst pre-mix, improves adhesivity and cross-linking the amino resin. Improved cross-linking decreases the cold flow between molecules and accordingly, improves the strength of the catalyst-amino resin mixture.

As shown in Example 1, the viscosity of the liquid catalyst/amino resin mixture is decreased two-fold over that of the powder catalyst/amino resin mixture. Viscosity, being a measure of resistance to flow, is important for maintaining the adhesive properties of the resulting adhesive substance. If the adhesive substance is too viscous, the adhesive will not wet the wood. If the adhesive is too liquid, it will soak into the wood, thereby also proving ineffective.

In addition, as shown in Examples 2, 3 and 4, the wet shear strength of the liquid catalyst/amino resin is improved over that of the powder catalyst/amino resin used in the prior art. According to the Fruehauf Engineering Standards, the minimum required wet shear is 525 psi while the liquid catalyst/amino resin combination of the present invention (with 22% liquid catalyst and 78% amino resin) has a wet shear that is two to three times the minimum strength. The dry shear is also 10% higher than that of powder/amino resin catalysts. Additionally, in most cases, the dry shear and wet shear provide 100% wood shear failure, which is indicative of excellent shear strength.

In a preferred embodiment, the pot life, or time elapsing between the time the resulting adhesive substance is ready for use and the time when the mixture is no longer useable is at least 45 minutes.

It is recommended that the liquid catalyst be mixed with the amino resin at temperatures between 16 and 30° C. where the composition of the catalyst is in its liquid state.

EXAMPLE 1

A liquid catalyst of the following composition was mixed with MUF resin 9430 from ARC Resin Corporation and was applied onto oak (edge laminating) and cured with high frequency heating. A standard mixture using powder catalyst 9532 and MUF resin 9430 from ARC Resin Corporation was also used as a standard. P-1036 refers to Multibond's self-crosslinking polyvinylacetate.

| Composition A | % by weight |
|---|---|
| P-1036 | 71.5 |
| water | 10.9 |
| sodium chloride | 2.9 |
| citric acid | 7.0 |
| ammonium chloride | 7.0 |
| walnut shell flour | 0.7 |

| | Properties | | | | |
|---|---|---|---|---|---|
| Mixture % by weight | Initial Viscosity cps | pH | gel time | cycle press time | quality of adhesion |
| MUF 9430: 80 Comp A: 20 | 2210 | 4.9 | 30 sec | 125 sec | Excellent |
| MUF 9430: 75 Comp A: 25 | 2100 | 4.8 | 29 sec | 120 sec | Excellent |
| MUF 9430: 85 Powder CAT: 15 9532 | 5450 | 6.6 | 42 sec | 165 sec | excellent (standard powder catalyst) |

EXAMPLE 2

A liquid catalyst of the following composition was mixed with MUF resin 9430 from ARC Resin Corporation. A powder catalyst and MUF resin 9430 from ARC Resin Corporation was also used as a standard. The dry shear results indicate the strength of the catalyst/resin composition. P-1036 refers to Multibond's self-crosslinking polyvinylacetate.

| Composition B | % by weight |
|---|---|
| P-1036 | 71.2 |
| defoamer | 0.3 |
| sodium chloride | 2.8 |
| citric acid | 7.0 |
| ammonium chloride | 7.0 |
| walnut shell flour | 0.8 |
| water | 10.7 |

| mixture ratio | % by weight | cycle time | dry shear | wet shear |
|---|---|---|---|---|
| Composition B: MUF: | 20 80 | 125 | 3180 psi | 626 psi |
| Powder Catalyst: MUF: | 15 85 | 160 | 1800 psi | 525 psi |

EXAMPLE 3

A liquid catalyst of the following composition was mixed with MUF resin 9430 from ARC Resin Corporation. A powder catalyst and MUF resin 9430 from ARC Resin Corporation was also used as a standard. P-1036 refers to Multibond's self-crosslinking polyvinylacetate.

| Composition C | % by weight | | |
|---|---|---|---|
| P-1036 | 75.5 | | |
| defoamer | 0.4 | | |
| sodium chloride | 1.5 | | |
| citric acid | 5 | | |
| ammonium chloride | 5 | | |
| wood flour | 0.7 | | |
| water | 11.9 | | |
| mixture ratio | % by weight | cycle time | wet shear |
| Composition B: | 22 | 120 | 700 psi |
| MUF: | 78 | | |
| powder: | 15 | 160 | 525 psi |
| MUF: | 85 | | |

EXAMPLE 4

25% by weight of a liquid catalyst of the following composition was mixed with 75% by weight of MUF resin 9430 from ARC Resin Corporation, resulting in an increased wet shear of 1206 psi as compared to 525 psi for the standard powder catalyst. P1036 refers to Multibond's self crosslinking polyvinylacetate.

| Composition D | % by weight |
|---|---|
| P 1036 | 70.5 |
| defoamer | 0.3 |
| sodium chloride | 1.4 |
| tricalcium phosphate | 1.4 |
| citric acid | 4.9 |
| ammonium chloride | 4.9 |
| walnut shell flour | 0.7 |
| water | 15.9 |

What is claimed is:

1. An adhesive substance made from mixing a liquid catalyst comprising between 52 and 93% of a copolymer, between 3 and 14% of an acid, and, between 4 and 14% of an ammonium salt, with an amino resin.

2. The adhesive substance of claim 1 wherein the liquid catalyst is present in an amount equal to about 20–25% by weight.

3. The adhesive substance of claim 1 wherein the copolymer consists of a monomer and a compound selected from the group consisting of vinyl acetate, polyvinyl acrylic, and polyacrylic.

4. The adhesive substance of claim 3 wherein the monomer is N-methylolacrylamide.

5. The adhesive substance of claim 4 wherein the N-methylolacrylamide is present in the copolymer in an amount equal to 3 to 10%.

6. The adhesive substance of claim 3 wherein the amount of copolymer is between 70 and 78%.

7. The adhesive substance of claim 3 wherein the acid is selected from the group consisting of citric acid and salicylic acid.

8. The adhesive substance of claim 7 wherein the acid is present in an amount equal to 4 to 7% by weight.

9. The adhesive substance of claim 7 wherein the ammonium salt is present in an amount equal to 4 to 7% by weight.

10. The adhesive substance of claim 1 wherein the liquid catalyst further comprises an ionisable metal salt.

11. The adhesive substance of claim 10 wherein the ionisable metal salt is present in an amount equal to 0.01 to 3% by weight.

12. The adhesive substance of claim 10 wherein the ionisable metal salt is present in an amount equal to 1.5 to 3% by weight.

13. The adhesive substance of claim 10 wherein the ionisable metal salt is sodium chloride.

14. The adhesive substance of claim 13 wherein the liquid catalyst is present in an amount equal to about 20–25% by weight.

15. The adhesive substance of claim 1 wherein the liquid catalyst further comprises an inert filler.

16. The adhesive substance of claim 15 wherein the inert filler is present in an amount equal to about 0.01 to 1% by weight.

17. The adhesive substance of claim 15 wherein the inert filler is present in an amount equal to about 0.8 to 1% by weight.

18. The adhesive substance of claim 15 wherein the inert filler is nut-shell flour or fine hardwood flour.

19. The adhesive substance of claim 1 wherein the liquid catalyst further comprises water in an amount of from 0.01 to 16% by weight.

20. The adhesive substance of claim 19 wherein the water is present in an amount equal to 10.5 to 14% by weight.

21. The adhesive substance of claim 1 wherein the liquid catalyst further comprises a defoaming agent.

22. The adhesive substance of claim 1 wherein the liquid catalyst further comprises a buffer.

23. The adhesive substance of claim 22 wherein the buffer is tricalcium phosphate.

* * * * *